(12) United States Patent
Parkinson et al.

(10) Patent No.: US 9,640,181 B2
(45) Date of Patent: May 2, 2017

(54) TEXT EDITING WITH GESTURE CONTROL AND NATURAL SPEECH

(71) Applicant: Kopin Corporation, Westborough, MA (US)

(72) Inventors: Christopher Parkinson, Richland, WA (US); Shai Leib, Rocklin, CA (US)

(73) Assignee: Kopin Corporation, Westborough, MA (US)

( * ) Notice: Subject to any disclaimer, the term of this patent is extended or adjusted under 35 U.S.C. 154(b) by 67 days.

(21) Appl. No.: 14/577,600

(22) Filed: Dec. 19, 2014

(65) Prior Publication Data

US 2015/0187355 A1    Jul. 2, 2015

Related U.S. Application Data

(60) Provisional application No. 61/921,267, filed on Dec. 27, 2013.

(51) Int. Cl.
| | |
|---|---|
| *G10L 15/00* | (2013.01) |
| *G06F 3/033* | (2013.01) |
| *G10L 15/26* | (2006.01) |
| *G06F 17/24* | (2006.01) |
| *G06F 17/27* | (2006.01) |
| *G06F 1/16* | (2006.01) |
| *G06F 3/01* | (2006.01) |

(52) U.S. Cl.
CPC .............. *G10L 15/26* (2013.01); *G06F 1/163* (2013.01); *G06F 3/011* (2013.01); *G06F 3/017* (2013.01); *G06F 17/24* (2013.01); *G06F 17/2735* (2013.01)

(58) Field of Classification Search
CPC ....... G02B 27/017; G06F 17/24; G06F 3/012; G06F 3/017
USPC .......................................................... 704/235
See application file for complete search history.

(56) References Cited

U.S. PATENT DOCUMENTS

| | | | | |
|---|---|---|---|---|
| 5,696,521 | A | * 12/1997 | Robinson | ............. G02B 27/017 |
| | | | | 345/8 |
| 5,829,000 | A | * 10/1998 | Huang | .................... G10L 15/22 |
| | | | | 704/240 |
| 8,504,369 | B1 | 8/2013 | Chigier et al. | |
| 2007/0208567 | A1* | 9/2007 | Amento | .................. G10L 15/22 |
| | | | | 704/270 |

(Continued)

FOREIGN PATENT DOCUMENTS

WO    WO 2015/100107    7/2015

OTHER PUBLICATIONS

International Search Report and Written Opinion of PCT/US2014/071577 dated Mar. 23, 2015 entitled "Text Editing with Gesture Control and Natural Speech".

(Continued)

*Primary Examiner* — David Hudspeth
*Assistant Examiner* — Timothy Nguyen
(74) *Attorney, Agent, or Firm* — Hamilton, Brook, Smith & Reynolds, P.C.

(57) ABSTRACT

A speech processing engine of an HSC device transcribes user utterance input and displays resulting text on a microdisplay. The speech processing engine further provides to the user text editing functions and auto suggestions. The user interface utilizes head gesture control and natural language for text editing. Standard language dictionaries, user's dictionary and user's address book contacts data are utilized.

18 Claims, 5 Drawing Sheets

(56) References Cited

U.S. PATENT DOCUMENTS

| | | | |
|---|---|---|---|
| 2010/0250250 A1* | 9/2010 | Wiggs | G10L 15/32 |
| | | | 704/235 |
| 2010/0315329 A1 | 12/2010 | Previc et al. | |
| 2011/0115702 A1* | 5/2011 | Seaberg | G06F 3/017 |
| | | | 345/156 |
| 2012/0078627 A1 | 3/2012 | Wagner | |
| 2012/0262488 A1* | 10/2012 | Liu | G06F 17/24 |
| | | | 345/649 |
| 2013/0212515 A1* | 8/2013 | Eleftheriou | G06F 3/04886 |
| | | | 715/773 |
| 2013/0321390 A1 | 12/2013 | Latta et al. | |
| 2014/0142937 A1* | 5/2014 | Powledge | G06F 3/017 |
| | | | 704/235 |
| 2016/0070441 A1* | 3/2016 | Paek | G06F 3/04842 |
| | | | 715/773 |

OTHER PUBLICATIONS

International Preliminary Report on Patentability dated Jul. 7, 2016 for PCT/US2014/071577 entitled "Text Editing With Gesture Control and Natural Speech".

* cited by examiner

TEXT EDITING WITH GESTURE CONTROL AND NATURAL SPEECH

RELATED APPLICATION(S)

This application claims the benefit of U.S. Provisional Application No. 61/921,267, filed on Dec. 27, 2013. The entire teachings of the above application is incorporated herein by reference.

BACKGROUND OF THE INVENTION

Mobile computing devices, such as a laptop or notebook PC, a smart phone, and tablet computing device, are now common tools used for producing, analyzing, communicating, and consuming data in both business and personal life. Consumers continue to embrace a mobile digital lifestyle as the ease of access to digital information increases with high speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free, high quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear.

A "wireless computing headset" device, also referred to herein as a headset computer (HSC) or head mounted display (HMD), includes one or more small, high resolution micro-displays and associated optics to magnify the image. The high resolution micro-displays can provide super video graphics array (SVGA) (800×600) resolution or extended graphic arrays (XGA) (1024×768) resolution, or higher resolutions known in the art.

A wireless computing headset contains one or more wireless computing and communication interfaces, enabling data and streaming video capability, and provides greater convenience and mobility through hands dependent devices.

For more information concerning such devices, see co-pending patent applications entitled "Mobile Wireless Display Software Platform for Controlling Other Systems and Devices," U.S. application Ser. No. 12/348, 648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. application Ser. No. 61/638,419 filed Apr. 25, 2012, each of which are incorporated herein by reference in their entirety.

As used herein "HSC" headset computers, "HMD" head mounted display device, and "wireless computing headset" device may be used interchangeably.

Embodiments of the present invention have features of at least three forms of hands-free editing.

One feature is Text Dictation Post-Processing, which concerns techniques for automatically correcting dictated text using resources from the user's own environment. Such techniques include the use of auto-correction algorithms (based on a standard language dictionary and/or the user's personal dictionary.

Another feature concerns the use of speech commands to edit the message as a whole. Such commands include global find and replace commands, for example.

Another feature concerns using speech and gesture commands for selecting and editing words in a document (e.g., a text file).

In one aspect, the invention is a headset computer device including a microdisplay driven by a processor, a microphone configured to provide user utterances as input to the processor, and a speech processing engine executed by the processor. The speech processing engine configured to transcribe the user utterances and display resulting transcription text on the microdisplay, and be responsive to a user input directed to editing the displayed transcription text.

In one embodiment, being responsive to input from the user further may include providing editing assistance regarding the transcription text. In another embodiment, the editing assistance may include suggested alternatives to one or more portions of the transcription text. In another embodiment, the suggested alternatives are based at least on context of the portions of the transcription text within the transcription text. The editing assistance may include auto-correcting transcription text based on a dictionary. The dictionary may include one or more of a standard language dictionary and a personal dictionary.

In one embodiment, the editing assistance may include name correction using a local contact database. In another embodiment, the user input directed to editing the displayed transcription text includes at least one spoken global language command. In another embodiment, the user input may include at least one of a user control gesture, and a user control utterance, for selecting a portion of the transcription text. The user input may further include at least one of a user edit gesture, and a user edit utterance, for selecting an edit command to apply to the portion of the transcription text.

In another aspect, the invention is a method of editing on a headset computer device, including transcribing user utterances to produce transcription text, displaying the transcription text, and responding to user input directed to editing the displayed transcription text.

In one embodiment, responding to user input further includes providing editing assistance. Providing editing assistance may further include suggesting alternatives to one or more portions of the transcription text. The alternatives may be based at least on context of the portions of the transcription text within the transcription text. The portions of the transcription text may be individual words, or groups of words (i.e., phrases).

In one embodiment, providing editing assistance may include auto-correcting transcription text based on a dictionary. Providing editing assistance may also include correcting names using a local contact database, such as a contacts list or an address book, or other information structure containing names, addresses, phone numbers, and so on. In addition to correcting names, embodiments may use these information structures to correct street addresses and other components of the structure.

In one embodiment, the user input directed to editing the displayed transcription text includes at least one spoken global language command. In another embodiment, the user input includes at least one of a user control gesture, and a user control utterance, for selecting a portion of the transcription text. The user input may further include at least one of a user edit gesture, and a user edit utterance, for selecting an edit command to apply to the portion of the transcription text.

In another aspect, the invention is a non-transitory computer-readable medium for editing text, the non-transitory computer-readable medium comprising computer software instructions stored thereon. The computer software instructions, when executed by at least one processor, causes a computer system to transcribe user utterances to produce transcription text, display the transcription text, and respond to user input directed to editing the displayed transcription text.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1A:
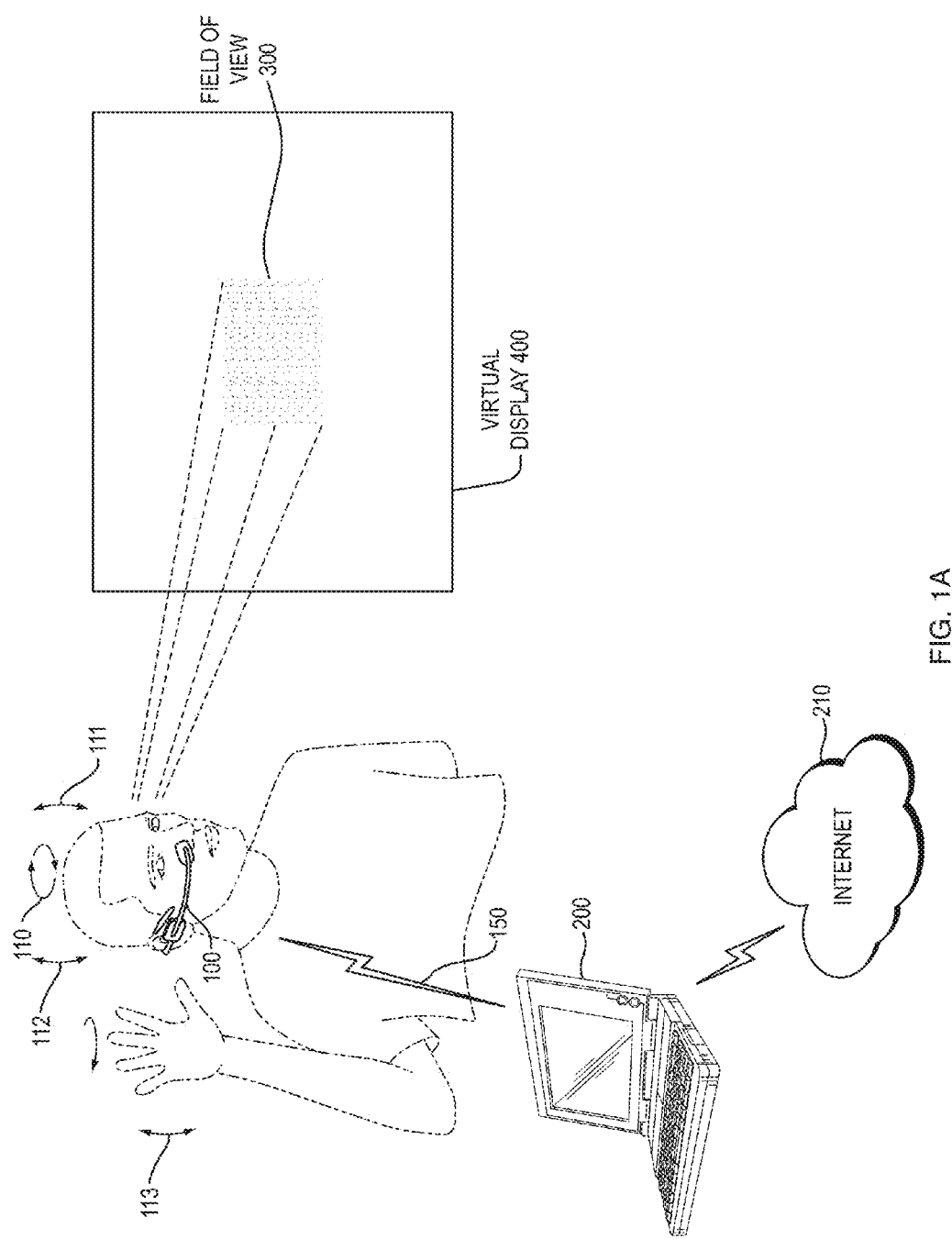
FIGS. 1A-1B are schematic illustrations of a headset computer cooperating with a host computer (e.g., Smart Phone, laptop, etc.) according to principles of the present invention.
Figure 1B:
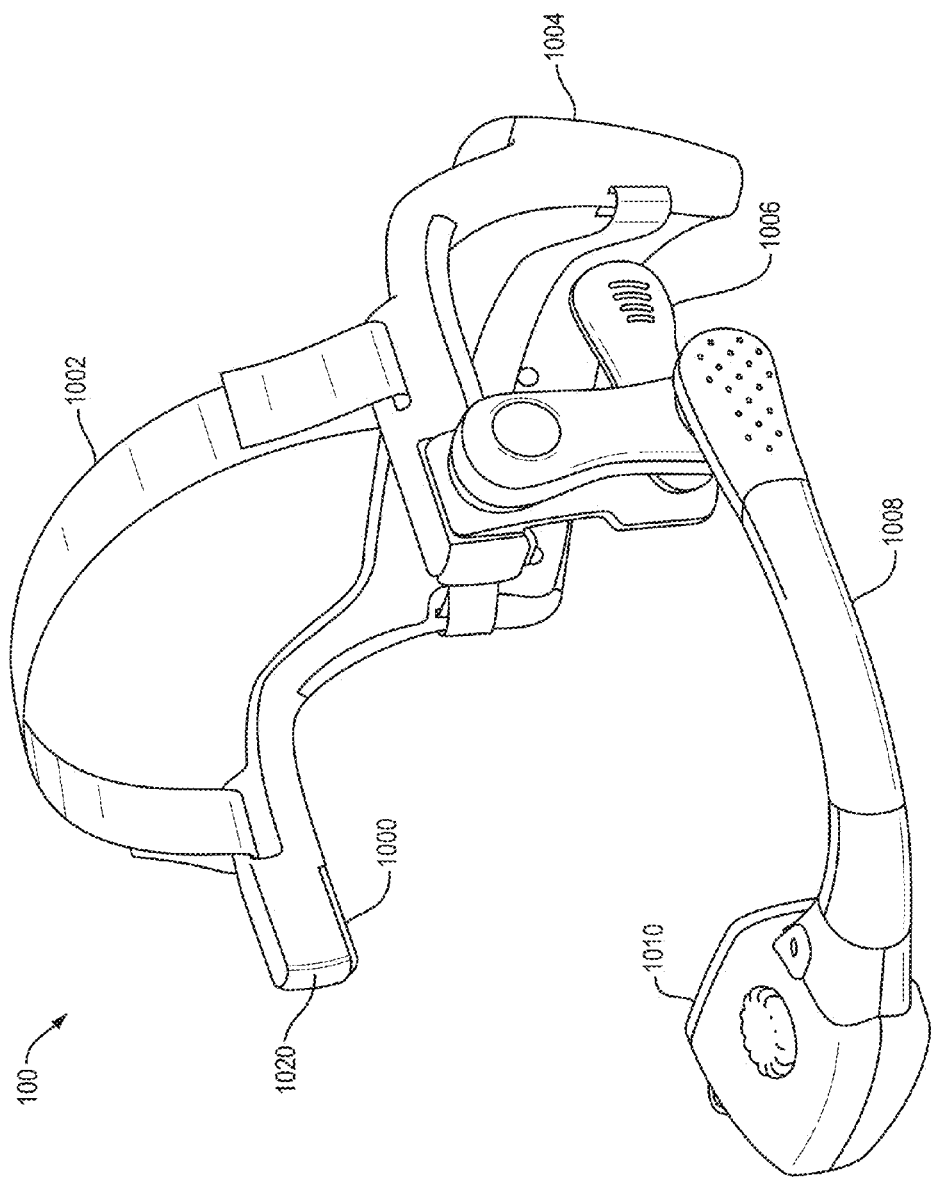

FIGS. 1A and 1B show an example embodiment of a wireless computing headset device 100 (also referred to herein as a headset computer (HSC) or head mounted display (HMD)) that incorporates a high-resolution (VGA or better) micro-display element 1010, and other features described below.

HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (FIG. 1B).

Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. A microphone (or microphones) operatively coupled to or integrated into the HSC 100 can be used to capture speech commands, which are then digitized and processed using automatic speech recognition techniques. Gyroscopes, accelerometers, and other micro-electromechanical system sensors can be integrated into the HSC 100 and used to track the user's head movements 110, 111, 112 to provide user input commands. Cameras or motion tracking sensors can be used to monitor a user's hand gestures 113 for user input commands. Such a user interface may overcome the disadvantages of hands-dependent formats inherent in other mobile devices.

The HSC 100 can be used in various ways. It can be used as a peripheral display for displaying video signals received and processed by a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033).

In an example embodiment, the host 200 may be further connected to other networks, such as through a wireless connection to the Internet or other cloud-based network resources, so that the host 200 can act as a wireless relay between the HSC 100 and the network 210. Alternatively, some embodiments of the HSC 100 can establish a wireless connection to the Internet (or other cloud-based network resources) directly, without the use of a host wireless relay. In such embodiments, components of the HSC 100 and the host 200 may be combined into a single device.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the micro-display subassembly is able to be positioned within the user's field of view 300 (FIG. 1A), preferably in front of the eye of the user or within its peripheral vision preferably slightly below or above the eye. Arm 1008 also provides the electrical or optical connections between the micro-display subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A and 1B is a monocular micro-display presenting a single fixed display element supported on the face of the user with a cantilevered boom, it should be understood that other mechanical configurations for the remote control display device 100 are possible, such as a binocular display with two separate micro-displays (e.g., one for each eye) or a single micro-display arranged to be viewable by both eyes.

Figure 2:
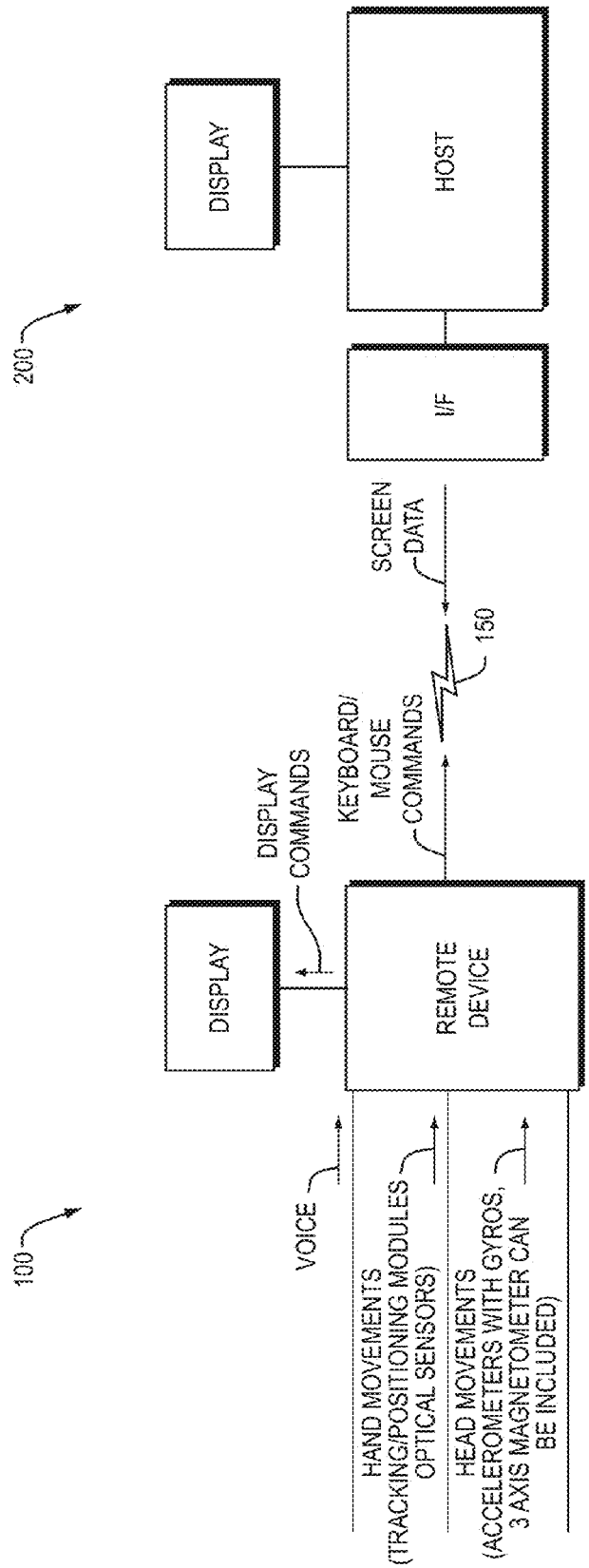
FIG. 2 is a block diagram of flow of data and control in the embodiment of FIGS. 1A-1B.

FIG. 2 is a block diagram showing more detail of an embodiment of the HSC or HMD device 100, host 200 and the data that travels between them. The HSC or HMD device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software (processors) in the HSC or HMD device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC or HMD device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC or HMD device 100.

In one embodiment, the HSC 100 may take the form of the device described in a co-pending US Patent Publication Number 2011/0187640, which is hereby incorporated by reference in its entirety.

In another embodiment, the invention relates to the concept of using a Head Mounted Display (HMD) 1010 in conjunction with an external 'smart' device 200 (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small-simply instructions on how to lay out a screen, which text to display, and other stylistic information such as drawing arrows, or the background colors, images to include, etc.

Additional data could be streamed over the same 150 or another connection and displayed on screen 1010, such as a video stream if required by the host 200.

Figure 3:
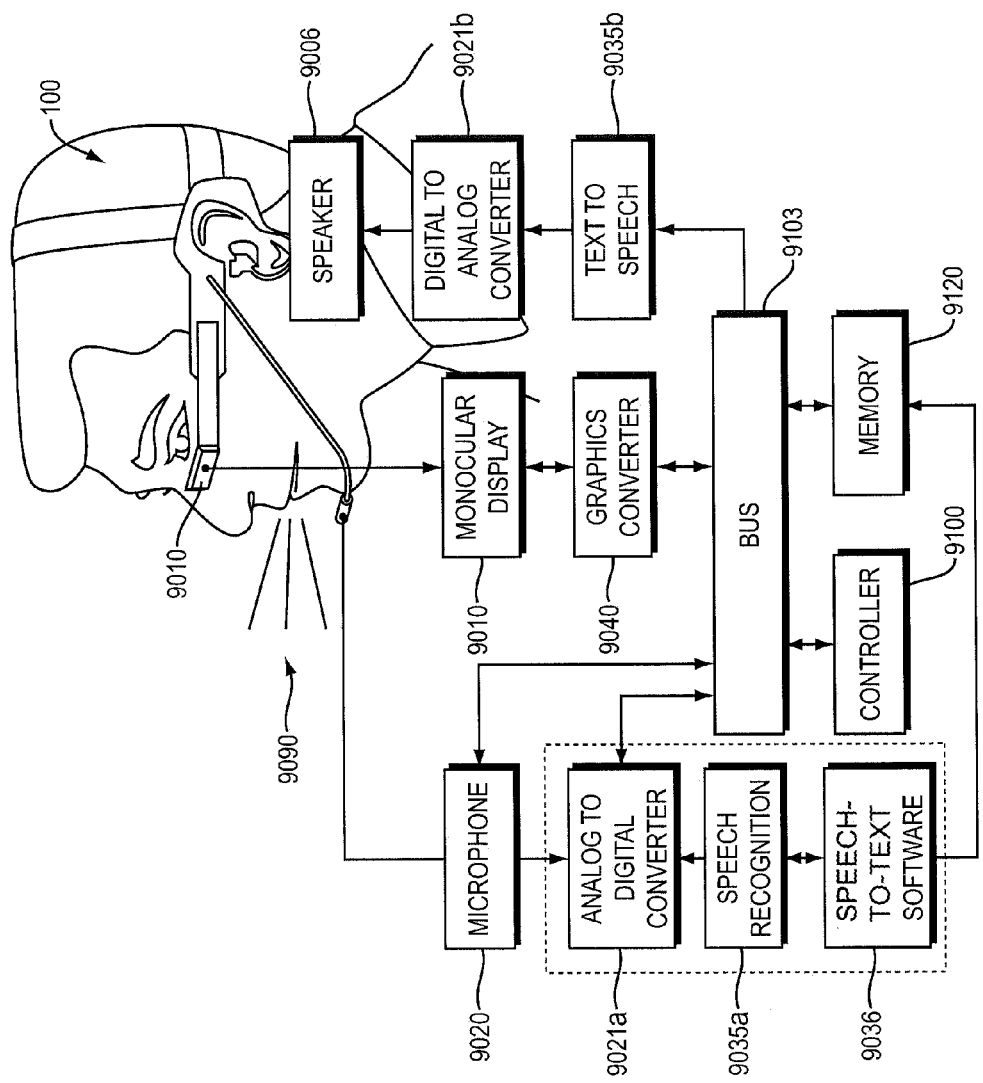
FIG. 3 is a schematic view of one embodiment with ASR (speech recognition module).

FIG. 3 shows an example embodiment of a wireless hands-free video computing headset 100 under voice command, according to one embodiment of the present invention. The user may be presented with an image on the micro-display 9010, for example, as output by host computer 200 application mentioned above. A user of the HMD 100 can employ joint head-tracking and voice command text selection software module 9036, either locally or from a remote host 200, in which the user is presented with a sequence of screen views implementing hands free text selection on the micro-display 9010 and the audio of the same through the speaker 9006 of the headset computer 100. Because the headset computer 100 is also equipped with a microphone 9020, the user can utter voice commands (e.g., to make command selections) as illustrated next with respect to embodiments of the present invention.

FIG. 3 shows a schematic diagram illustrating the modules of the headset computer 100. FIG. 3 includes a schematic diagram of the operative modules of the headset computer 100.

For the case of speech command replacement in speech driven applications, controller 9100 accesses user command configuration module 9036, which can be located locally to each HMD 100 or located remotely at a host 200 (FIGS. 1A-1B).

User configurable speech command or speech command replacement software module 9036 contains instructions to display to a user an image of a pertinent request dialog box or the like. The graphics converter module 9040 converts the image instructions received from the speech command module 9036 via bus 9103 and converts the instructions into graphics to display on the monocular display 9010.

The text-to-speech module 9035*b* may, contemporaneous with the graphics display described above, convert the instructions from text selection software module 9036 into digital sound representations corresponding to the contents of the screen views 410 to be displayed. The text-to-speech module 9035*b* feeds the digital sound representations to the digital-to- analog converter 9021*b*, which in turn feeds speaker 9006 to present the audio output to the user.

Speech command replacement/user reconfiguration software module 9036 can be stored locally at memory 9120 or remotely at a host 200 (FIG. 1A). The user can speak/utter the replacement command selection from the image and the user's speech 9090 is received at microphone 9020. The received speech is then converted from an analog signal into a digital signal at analog-to-digital converter 9021 a. Once the speech is converted from an analog to a digital signal speech recognition module 9035*a* processes the speech into recognized speech.

The recognized speech is compared against known speech and processed into text according to instructions of speech-to-text module 9036.

Advances in speech-to-text conversion technologies enable users to simply speak to their computing devices and have the spoken word converted, almost instantly, into text. This allows email, SMS, and other messages to be constructed in a hands-free manner.

The accuracy, however, of the speech-to-text systems may be less than perfect. Failure rates increase as background noise increases, and as spoken accents become stronger.

Furthermore, even if a spoken phrase is dictated with perfect accuracy, there will be many cases where the user, in reading the text transcription, will want to change some of the content before saving or sending the subject text file. If autocorrect functions are turned on, those functions may inadvertently change the user's input in a way that is contrary to the user's intentions.

In all of these cases, the user may desire the ability to edit the dictated message, i.e., the resulting transcription content. Typical dictation strategies rely on a user employing the touch screen of a mobile device to point and highlight the text to edit, possibly in conjunction with a keyboard to manually enter the corrections.

For the case of a truly hands-free device, such as a head-worn device 100 or accessory, the touch screen technique for entering dictation corrections may not be applicable.

Text Dictation Post-Processing—A first stage in ensuring text is close to that desired by the user is in dictation post-processing, i.e., processing of the text as soon as it is returned by the dictation engine (aka speech-to-text engine 9036).

One post-processing technique is an auto-correction algorithm, using a standard language dictionary and/or the user's personal dictionary, one or both stored local to the device 100. Memory 9120 may store these dictionaries, and instructions of modules 9035a and 9036 may utilize the dictionaries in processing (i.e., recognizing and autocorrecting) speech submitted by the user. As used herein, a "standard language dictionary" means a dictionary that has been compiled for use in general context, for example a dictionary provided by a third party entity for use by different end users. A personal dictionary, as used herein, means a specifically compile dictionary for use by a narrower audience than would use a standard language dictionary. A personal dictionary may be used by a specific person, and may be modified and edited to be specifically sued by that person.

Another post-processing technique is name correction, based on a local contact database (such as the user's address book or contact list) on the device 100 (memory 9120). For example, many dictation engines have no concept of the users address book and may return names that while may be correctly spelled in one environment, are not correctly spelled in the user's environment. Fuzzy matching algorithms can be used by modules 9035a and 9036 to compare names found in the dictated text against those in the user's address book. In turn, modules 9035a, 9036 may correct any obvious misspellings.

For example, a name interpreted as "Chris" might be replaced with "Kris" by module 9036, where the term is phonetically the same, but needs spelling correction according to the user's address book in memory 9120.

The device 100 may also use context to make a proper correction. For example, if a user's address book includes "Kris Jones" and "Chris Baker," the first name spoken with the last name would provide a clue as to whether the correct spelling should be "Kris" or "Chris."

Global Natural Language Commands—The Global Natural Language commands in speech processing modules 9035a and 9036 allow a user to issue commands that apply to the whole document. A "find and replace all" is an example of a Global Natural Language Command. The spoken command is captured (parsed and recognized by module 9035a) and sent to the NLU engine (part of module 9036) for processing, along with the current message to edit.

Specific examples of global natural language commands in one embodiment may include:
(1) Replace Phrase A with Phrase B (e.g., "Replace the name Chris with John" or "Change 10:30 pm to 10:3 pm)
(2) Delete Sections (e.g., "Delete the last line of the text" or "Delete the first paragraph")

Such global commands may be programmed into the instruction set of modules 9035a and 9036.

Speech and Gesture Commands for Editing Specific Words—In one embodiment, the HSC 100 tracks head movements to selectively highlight words of a textual phrase within the user's field of view. The speech processing module 9036 may present a menu of options to the user, e.g., {cut|copy|paste|replace|suggest|Define}. The menu may be displayed through microdisplay 9010, and audibly presented through speaker 9006 as previously operationally described. Third Party content providers, such as a dictionary and/or a thesaurus, could be accessed by modules 9035a and 9036 to provide definitions for words and to suggest alternative word choices.

HSC 100 may obtain the selection of words in text by tracking the movement of the user's head, so as to creating a scrolling effect to move the cursor (pointer) along the displayed text to get to the desired word. For example, a user may cause word selection to progress from word to word in a sentence from left to right in his field of view by turning his head from left to right (i.e., clockwise) or tilting his head to the right. The user may stop the word progression to select a particular word by returning his head to a neutral position (i.e., facing straight ahead, tilted neither to the left nor to the right).

Once a particular word is selected, the HSC 100 may present an edit options menu with several editing options, e.g., {cut|copy|paste|replace|suggest|define}. The user may use head tilting and/or rotation as described above to select one of the edit options, and use a gesture, head movement or spoken utterance (or similar input) to execute the selected command.

Embodiments 100 may employ autosuggest to render (on display 9010 and through speaker 9006) the identification of contacts, dates, and other entities to correct the spelling of words taken from a third party trained NLU model. For example, a user speaks the name "Mac-ken-zee" and the NLU model recognizes and presents the word "McKenzie." Device 100 may use a "contacts" database to search for matches for McKenzie, and autosuggest "Mackenzie Adams (madams@gmail.com)" as the contact that most closely matches the recognized name "McKenzie."

HSC 100 may suggest alternative words such as synonyms by classifying the context of the statement. For instance, if the context of the statement is to do computations, for example "for divided by three," then HSC 100 highlights the displayed word "for" on display 9010, and speech module 9036 issues the suggested replacement "four" displayed on microdisplay 9010 and enunciated through speaker 9006 as illustrated.

In one embodiment, processing for suggesting alternative words based on context within a sentence or other structure may be accomplished with program procedures for modules 9035a and 9036, using for example one or more of the elements set forth below, or combinations of similar elements.

Tokenize the sentence—First, partition each sentence into a list of tokens. Each sentence is partitioned into a list of words, and we remove the stop words. Stop words are frequently occurring, insignificant words that appear in a database record, article, or a web page, etc.

Action Classification Tagging—Using a training corpus, the context and action of the phrase is determined. For example, the detection of a mathematical operation "divided by" indicates a mathematical action, and a mathematical entity set is chosen to disambiguate the statement.

Entity Disambiguation Tagging—This task is to identify the correct entity (like numeric, date time, or as a member of a set of entities) of each word in the sentence. The algorithm takes a sentence as input and a specified tag set. The output is a single best tag for each word. Tagging ambiguities are resolved by using a training corpus to compute the probability of a given word having a given tag in a given context.

Find the most appropriate sense or meaning for every entity in a sentence—To disambiguate a word, the gloss of each of its senses is compared to the glosses of every other word in a phrase. A word is assigned to the sense whose gloss shares the largest number of words in common with the glosses of the other words. For example the word "For" is preposition and the word "two" is a number. The context is determined to be a mathematical division operation that expects a numerical dividend and a divisor to complete the mathematical operation. Since "for" is not numeric, fuzzy logic is employed to determine the edit distance between "for" and the next closest number which is "four" and is numeric. The word "four" is then suggested as the appropriate substitution for "for" in the spoken phrase.

Figure 4:
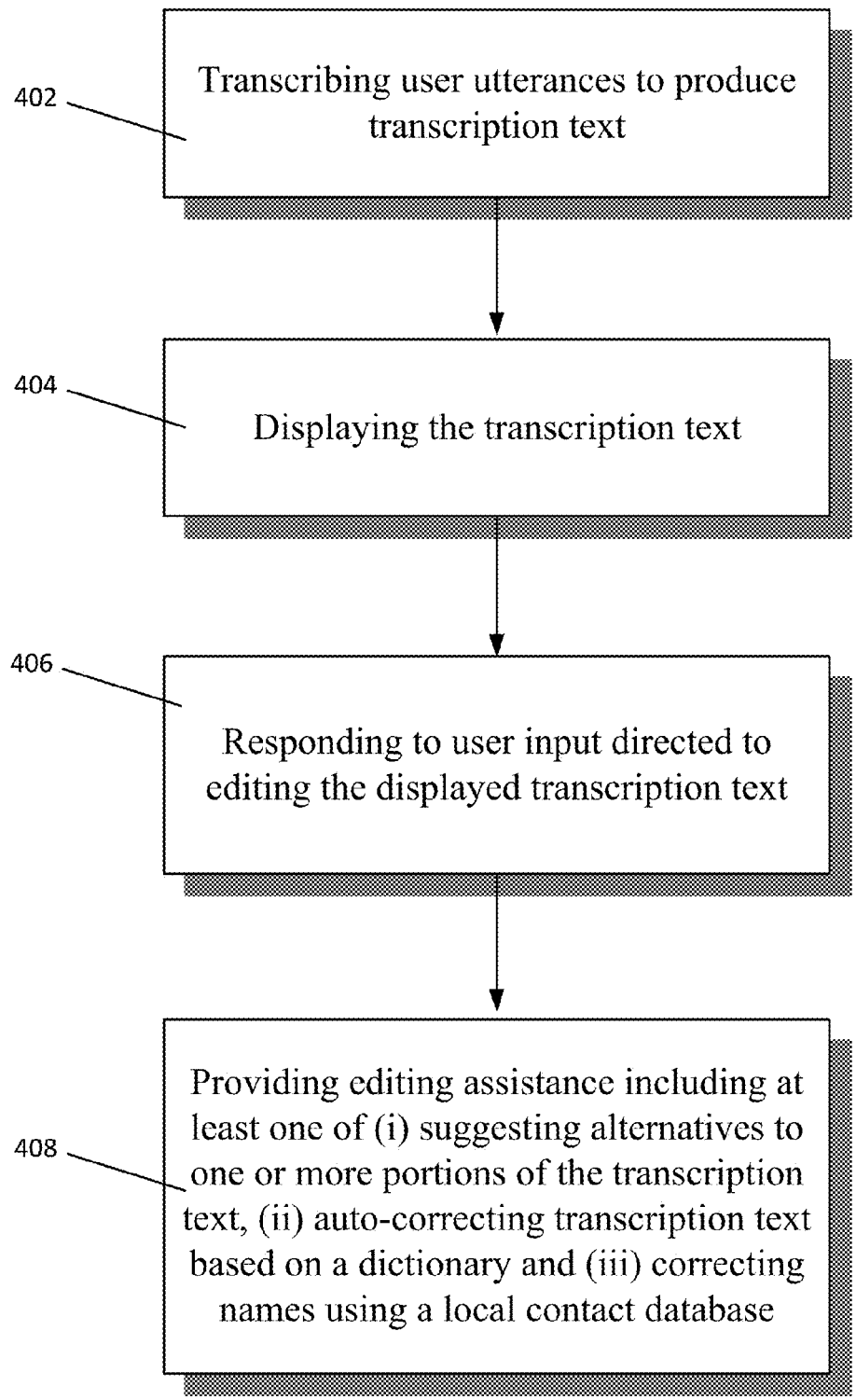
FIG. 4 illustrates a method of editing text on a headset computer device according to embodiments of the invention.

FIG. 4 illustrates a method of editing text on a headset computer device, including transcribing user utterances to produce transcription text, displaying 404 the transcription text, responding 406 to user input directed to editing the displayed transcription text, and providing 408 editing assistance. The editing assistance may include one or more off (i) suggesting alternatives to one or more portions of the transcription text, (ii) auto-correcting transcription text based on a dictionary and (iii) correcting names using a local contact database, among others.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A headset computer device comprising:
   a microdisplay driven by a processor;
   a microphone configured to provide user utterances as input to the processor;
   head tracking circuitry configured to provide orientational sensing information describing an orientation of the headset computer;
   a joint head-tracking and voice command text selection module configured to receive the user utterances and orientational sensing information and produce user input based on the user utterances and orientational sensing information;
   a speech processing engine, executed by the processor, the speech processing engine configured to (i) transcribe the user utterances and display resulting transcription text on the microdisplay, (ii) be responsive to the user input directed to editing the displayed transcription text, and (iii) provide editing assistance using fuzzy matching.

2. The headset computer device of claim 1, wherein the editing assistance includes suggested alternatives to one or more portions of the transcription text.

3. The headset computer device of claim 2, wherein the suggested alternatives are based at least on context of the portions of the transcription text within the transcription text.

4. Previously presented) The headset computer device of claim 1, wherein the editing assistance includes auto-correcting transcription text based on a dictionary.

5. The headset computer device of claim 4, wherein the dictionary includes one or more of a standard language dictionary and a personal dictionary.

6. The headset computer device of claim 1, wherein the editing assistance includes name correction using a local contact database.

7. The headset computer device of claim 1, wherein the user input directed to editing the displayed transcription text includes at least one spoken global language command.

8. The headset computer device of claim 1, wherein the user input includes at least one of (i) a user control gesture, and (ii) a user control utterance, for selecting a portion of the transcription text.

9. The headset computer device of claim 8, wherein the user input further includes at least one of (i) a user edit gesture, and (ii) a user edit utterance, for selecting an edit command to apply to the portion of the transcription text.

10. A method of editing on a headset computer device, comprising:
    by a processor,
    generating orientational sensing information describing an orientation of the headset computer;
    producing user input based on user utterances received via a microphone and the orientational sensing information;
    transcribing the user utterances to produce transcription text;
    displaying the transcription text;
    responding to the user input directed to editing the displayed transcription text; and
    providing editing assistance using fuzzy matching.

11. The method of claim 10, wherein providing editing assistance includes suggesting alternatives to one or more portions of the transcription text.

12. The method of claim 11, wherein the alternatives are based at least on context of the portions of the transcription text within the transcription text.

13. The method of claim 10, wherein providing editing assistance includes auto-correcting transcription text based on a dictionary.

14. The method of claim 10, wherein providing editing assistance includes correcting names using a local contact database.

15. The method of claim 10, wherein the user input directed to editing the displayed transcription text includes at least one spoken global language command.

16. The method of claim 10, wherein the user input includes at least one of (i) a user control gesture, and (ii) a user control utterance, for selecting a portion of the transcription text.

17. The method of claim 16, wherein the user input further includes at least one of (i) a user edit gesture, and (ii) a user edit utterance, for selecting an edit command to apply to the portion of the transcription text.

18. A non-transitory computer-readable medium for editing text, the non-transitory computer-readable medium comprising computer software instructions stored thereon, the computer software instructions, when executed by at least one processor, causes a computer system to:

generate orientational sensing information describing an orientation of the headset computer;

produce user input based on user utterances received via a microphone and the orientational sensing information;

transcribe the user utterances to produce transcription text;

display the transcription text;

respond to the user input directed to editing the displayed transcription text; and provide editing assistance using fuzzy matching.

* * * * *

UNITED STATES PATENT AND TRADEMARK OFFICE
CERTIFICATE OF CORRECTION

PATENT NO.         : 9,640,181 B2
APPLICATION NO.    : 14/577600
DATED              : May 2, 2017
INVENTOR(S)        : Christopher Parkinson and Shai Leib It is certified that error appears in the above-identified patent and that said Letters Patent is hereby corrected as shown below:

In the Claims

In Column 10, Line 15, in Claim 4, delete "Previously Presented)" after "4.".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*